Figure 1:
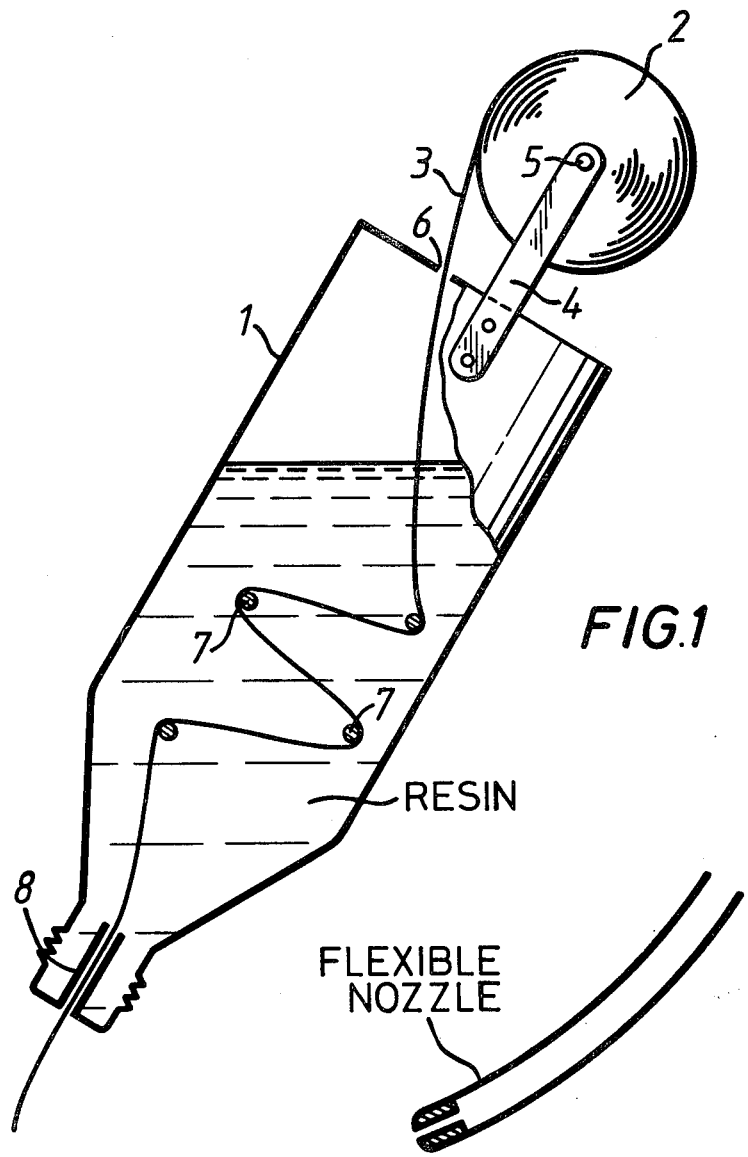

United States Patent [19]

Critchlow

[11] 4,448,623

[45] May 15, 1984

[54] WETTED FILAMENT DISPENSER AND WINDING THEREWITH

[75] Inventor: Keith B. Critchlow, London, England

[73] Assignee: The British Petroleum Company Limited, London, England

[21] Appl. No.: 145,037

[22] Filed: Apr. 30, 1980

[30] Foreign Application Priority Data

May 4, 1979 [GB] United Kingdom ................. 7915564

[51] Int. Cl.³ ............................................ B65H 81/00
[52] U.S. Cl. ................................. 156/169; 156/433; 156/578; 156/579
[58] Field of Search ................ 156/575, 579, 574, 577, 156/578, 524, 169, 166, 175, 172, 425, 433; 118/404, 405, 420

[56] References Cited

U.S. PATENT DOCUMENTS

| | | | |
|---|---|---|---|
| 2,440,179 | 4/1948 | Mabli | 118/420 |
| 2,843,083 | 7/1958 | Epling | 118/420 |
| 3,125,483 | 3/1964 | De Ganahl | 156/175 |
| 3,131,108 | 4/1964 | Kennard | 156/575 |
| 3,733,233 | 5/1973 | Griffiths | 156/175 |
| 3,944,065 | 3/1976 | Wooddy et al. | 156/137 |

*Primary Examiner*—Michael W. Ball
*Attorney, Agent, or Firm*—Morgan, Finnegan, Pine, Foley & Lee

[57] ABSTRACT

A dispenser of continuous resin wetted filaments has a container of a size suitable for hand holding, the container holding a supply of resin. A drum or reel of dry filament is positioned either inside or outside the container. The filament passes over filament guides in the container and through an outlet nozzle. The wetted filament is dispensed by attaching it to a former and then pulling the device away from the former. The device may include a filament tensioner so that the operator can vary the tension of the dispensed filament.

12 Claims, 2 Drawing Figures

WETTED FILAMENT DISPENSER AND WINDING THEREWITH

The present invention relates to lattice structures formed by winding resin impregnated strands about a former and more particularly relates to an applicator for applying the strands to the former.

The conventional ways of manufacturing structures such as pylons, aeroplane fuselages, grid structures of bridges, vehicles, machine frames, roof constructions, furniture etc., usually involves the use of pre-manufactured rods of material, cutting them to length and connecting the ends to one another until a kind of grid construction is completed. Alternatively, a mould may be used to cast the structure with metal or any suitable material. Or the structure may be produced by cutting a pre-manufactured sheet or board to shape and connecting them with nails or rivets, welding or glueing to produce the desired shape, e.g. Dexion.

Those conventional procedures have the disadvantage that materials have to be pre-manufactured, prepared, cut to size and connecting members fitted, e.g. by rivetting or welding, while cast members can only be manufactured by the use of costly and often complicated moulds and furnaces.

It is well known to form geodetic structures such as propellers, pressure vessels, e.g. rocket motor casings by winding resin-impregnated filaments onto a former and curing the resin. Also, structures using strand and resin type materials wound over pins on a fixture are known and British patent application no. GB 2004835 A describes the fabrication of such structures by hand winding of resin wetted filaments about hooks or projections on a former and subsequent curing.

The manual winding of resin wetted filaments has a number of problems associated with it. Thus, in the case of, for example, polyester resins the operator is exposed to vapours from the resin bath and the winding tends to be a messy and sticky process. The present invention is directed towards a means for winding which reduces these problems.

Thus, according to the present invention there is provided a device suitable for dispensing continuous wetted filaments comprising a container of a size suitable for holding in the hand, means for supplying a continuous filament to filament guides within the container, means for holding a quantity of liquid through which the filament passes and an outlet nozzle for the wetted filament.

The means for holding a quantity of liquid may be the body of the container itself or it may be a smaller reservoir, preferably positioned near the outlet, supplied with liquid from an external source.

The source of continuous dry filament may be a drum or reel and may be positioned inside or outside of the container. Although a single filament may be used, normally a bundle of filaments forming a strand will be dispensed. Preferably the filaments pass over spreader bars within the container which tends to distribute the resin more evenly throughout the strand by tending to separate the individual fibres allowing greater penetration and impregnation by the resin. For ease of operation the device is advantageously formed with a handle. The handle may also have a trigger which, on operation can tension the filaments, thereby enabling the operator to wind structures having different degrees of winding tensions.

The outlet nozzle of the device may be made interchangeable, the outlet aperture size being used to regulate the filament/resin ratio, i.e the smaller the aperture the less resin adheres to the filament. The nozzle may also have a flexible attachment facilitating the winding of the filament around a former.

The outlet nozzle may comprise a single orifice which would usually have a circular cross-section but may also be of other shape cross-sections if required, for example, to produce decorative effects by producing strands of non-circular cross-section. Also the outlet nozzle may comprise one or more orifices so that a plurality of filaments or strands may be withdrawn.

The invention will now be described by way of example only.

Figure 2:
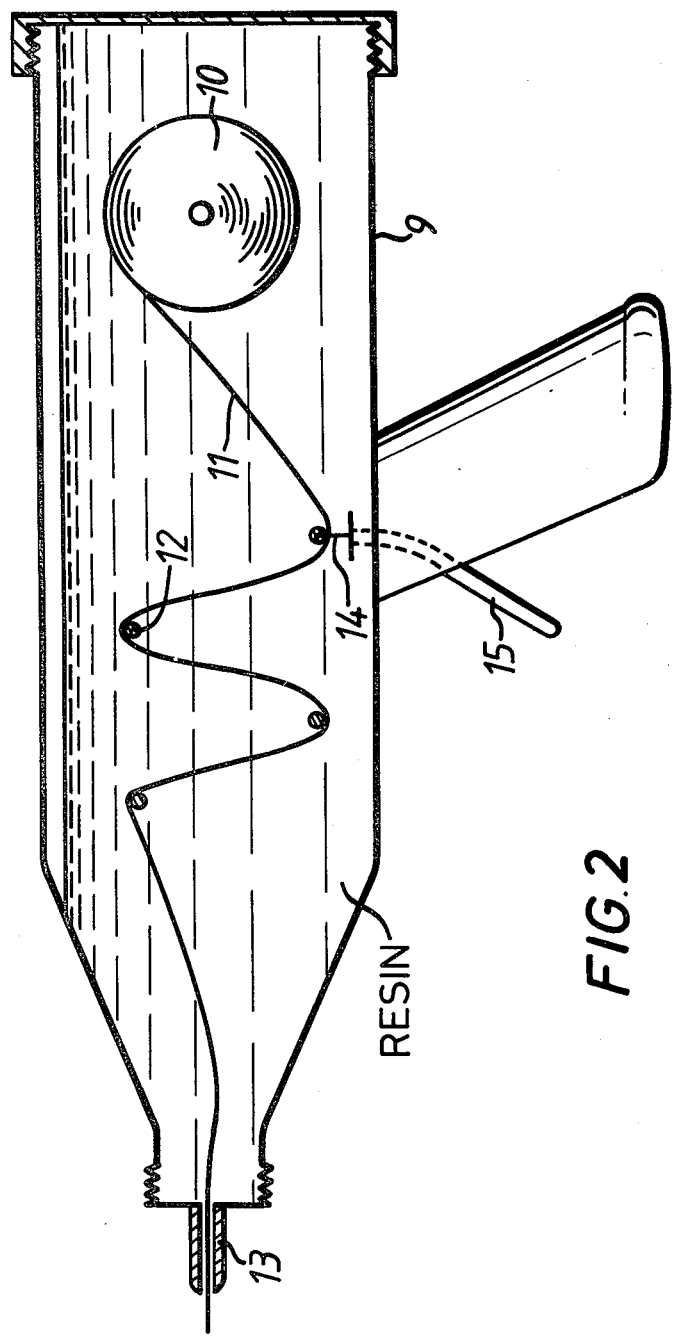

FIG. 1 shows a device according to the invention having an external filament reel and FIG. 2 shows a device having an internal filament reel.

In FIG. 1, a hollow container 1 of generally cylindrical form and made from sheet metal has a drum 2 mounted at one end by a metal strut 4. The drum 2 carries glass fibre filaments 3, in the form of a continuous strand, each strand containing about 1000 fibres of about 10 microns diameter. The drum 2 is able to freely rotate on the pivot 5.

The container 1 has a length of about 20 cms and an internal volume of about 300 ccs. The container has an outlet nozzle 8 having a nozzle diameter of one mm at the opposite end of the container 1 to the drum 2. The nozzle 8 is screw fitted onto the container 1 and is interchangeable with other nozzles having different outlet diameters. The nozzle also may serve as an inlet for filling the container 1 with a resin, e.g. polyester resin. Alternatively, a separate inlet may be used for the resin or the container may be directly connected to an external source of resin.

A number of spreader bars 8 are disposed alternately on either side of the longitudinal axis of the container 1. The bars 8 comprise short metal rods having a surface allowing smooth passage of a filament.

During use, the applicator is first threaded by passing the continuous glass fibre strand into the container 1 through orifice 6, then around the spreader bars 6 and through the outlet nozzle 8. The strand is then attached to a former, the precise shape of which is dependent on the shape of the structure to be formed. The details of a suitable winding process are described in our UK patent application number 2004835 A. The applicator is then filled with polyester resin, the orifice 6 being sealed to prevent egress of the resin or one alternative may be to use the applicator in a position such that resin does not escape from the orifice 6. By pulling the applicator away from the former, further glass fibre is dispensed from the drum 2 and into the resin in container 1. The glass fibre is impregnated with the resin, fthe impregnation being assisted by spreader bars 8 which tend to flatten out the individual fibres and distribute the resin more evenly throughout the strands. The wet resin coated glass fibre strand then emerges from nozzle 8 and may be wound as desired around the former to the required shape.

In order to facilitate winding of the wetted fibre around the former, it is advantageous to use a flexible extension as shown in FIG. 1 (*b*). The extension may comprise a portion of flexible plastic tubing, e.g. polyethylene having an outlet nozzle at one end and a means for attachment to the container at the other end.

FIG. 2 shows a further embodiment of the invention which includes a filament tensioning device.

A container 9 encloses a drum 10 carrying continuous glass fibre rovings or filaments 11, the container being filled with polyester resin. The rovings from the drum 10 are passed over a number of spreader bars 12 and then through interchangeable outlet nozzle 13. One of the spreader bars 14 is adjustable and is varied by an external trigger 15 which allows the operator to vary the tension of the filaments. The trigger 15 is continuously adjustable by the operator, the trigger being linked by a cable or lever to a movable spreader bar. Thus as the trigger is squeezed, the movable spreader bar applies more or less tension to the filament as desired by the operator.

I claim:
1. A wetted filament dispenser comprising:
   (a) a container of a size suitable for hand holding and having an outlet nozzle;
   (b) a source of a bundle of filaments forming a continuous strand;
   (c) means for holding a quantity of liquid through which said continuous strand passes;
   (d) spreader guide bars inside said container over which said wetted continuous strand passes prior to passing through said outlet nozzle; and
   (e) manually-operated means for regulating the tension of said continuous strand as it is dispensed through said outlet nozzle.

2. Device according to claim 1 in which the means for supplying a continuous filament is a reel or drum carrying continuous strand.

3. Device according to claim 2 in which the continuous strand is glass fibre.

4. Device according to claim 1 in which the strand supplying means is located within the container.

5. Device according to claim 1 in which the strand guides comprise smooth metal rods.

6. Device according to claim 1 in which the strand guides nearest the outlet are substantially symmetrically disposed about the extrapolated axis of the outlet.

7. Device according to claim 1 which has an extension comprising a portion of flexible tubing having the outlet nozzle at one end and means for attachment to the container at the other end.

8. Device according to claim 7 in which the flexible tube extension comprises polyethylene tubing.

9. Device according to claim 1 in which the tensioning means comprise a moveable strand guide.

10. Device according to claim 9 in which the strand guide is moved by a cable attached to a manually operable lever or trigger.

11. Device according to claim 1 connected to an external source of resin or like liquid.

12. A method of winding continuous strand around a former of predetermined shape comprising (a) attaching a strand from a device according to claim 1 to the former and (b) pulling the device away from the attachement point to thereby dispense wetted strand and (c) subsequently passing the wetted strand around the former to describe the predetermined shape.

* * * * *